F. LEDERER.
RIM SPREADER.
APPLICATION FILED MAY 19, 1919.
1,335,248. Patented Mar. 30, 1920.
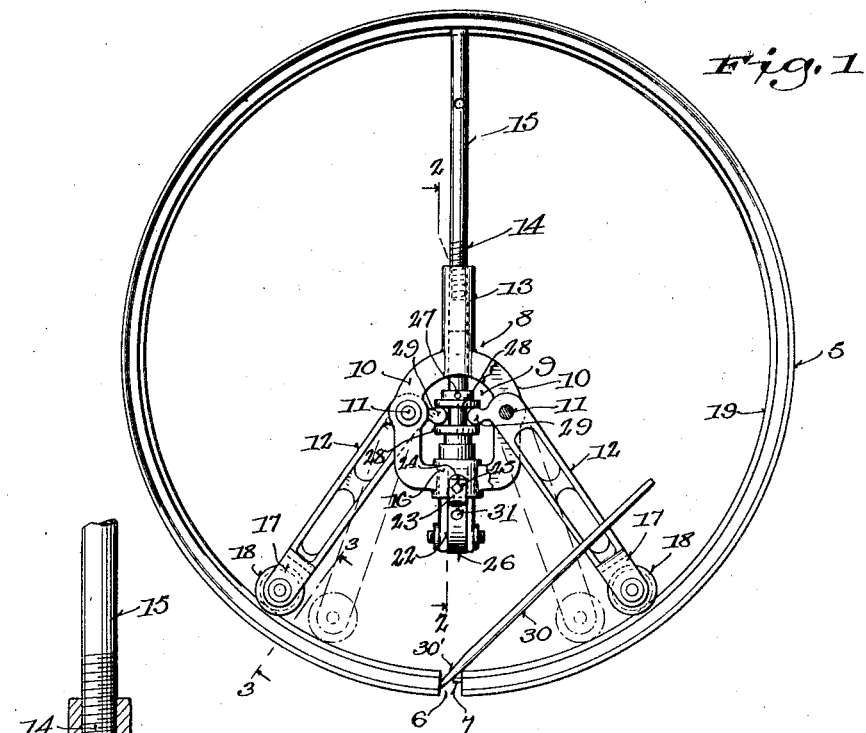
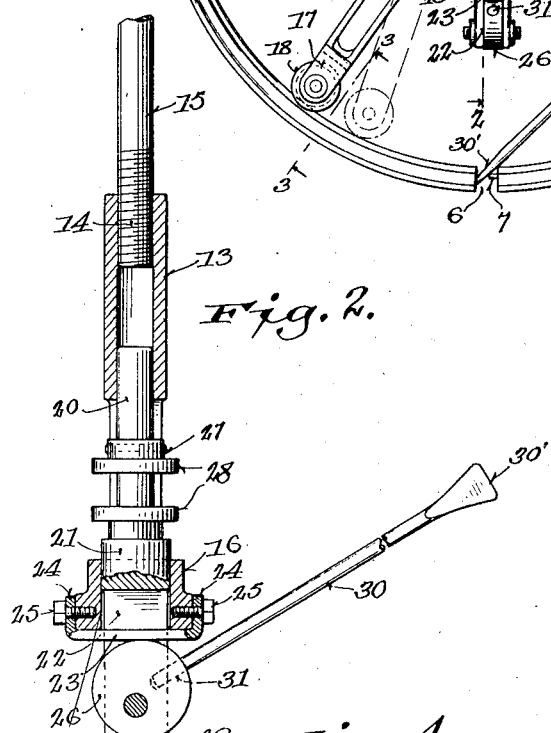
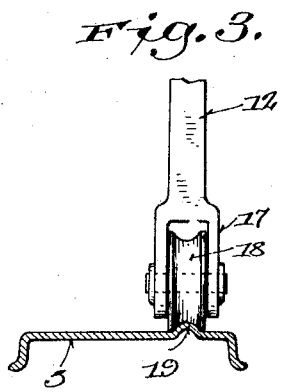
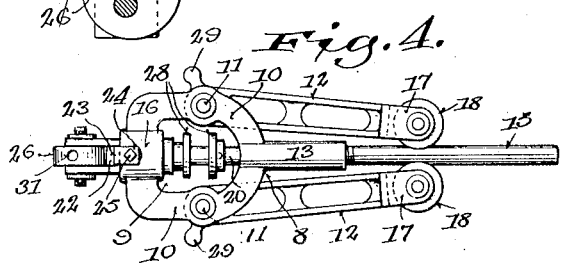
Inventor
Friedrich Lederer.
By Morsell + Keeney.
Attorneys.

UNITED STATES PATENT OFFICE.

FRIEDRICH LEDERER, OF MILWAUKEE, WISCONSIN, ASSIGNOR TO NECEDAH MANUFACTURING COMPANY, A CORPORATION OF WISCONSIN.

RIM-SPREADER.

1,335,248.  Specification of Letters Patent.  Patented Mar. 30, 1920.

Application filed May 19, 1919. Serial No. 298,003.

*To all whom it may concern:*

Be it known that I, FRIEDRICH LEDERER, a citizen of the United States, and resident of Milwaukee, in the county of Milwaukee and State of Wisconsin, have invented new and useful Improvements in Rim-Spreaders, of which the following is a description, reference being had to the accompanying drawings, which are a part of this specification.

The present invention relates to certain new and useful improvements in rim spreaders, and has for its primary object to provide positive means for spreading automobile rims and attaching tires thereto, or for spreading the rim to unlock its securing means preliminary to detaching a tire therefrom.

Another object of this invention is to provide an automobile rim spreader capable of use with any style of detachable rim.

A further object of the present invention is to provide a rim spreader of convenient, durable and practical construction, and which may be folded to occupy a small amount of space when not in use.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawing I have illustrated one complete example of the physical embodiment of my invention constructed according to the best mode I have so far devised for the practical application of the principles thereof, and in which:

Figure 1 is a side plan view of a split detachable rim with my invention applied thereto;

Fig. 2 is a view taken on the line 2—2 of Fig. 1, said view being part in section and part in elevation;

Fig. 3 is a plan view of the lower end of one of the swinging rim engaging members, said view being taken on the line 3—3 of Fig. 1; and Fig. 4 is a plan view of my device detached from the rim, the same being in folded position.

In the accompanying drawing, 5 designates an automobile rim which is split as at 6 and has at the ends thereof a conventional form of locking means 7. My invention comprises three rim engaging members carried by a yoke member 8 having one portion thereof provided with a recess 9 formed by side arms 10, and in which is pivoted as at 11 the inner ends of a pair of swinging rim engaging members 12.

The yoke member has extending centrally from its portion 10 a centrally bored sleeve 13 in which is adjustably secured the threaded end 14 of a substantially rigid rim engaging member 15, and in axial alinement with the bore of sleeve 13 and connecting the arms 10 of the yoke member is a bearing 16, to be later described. The outer extremity of each member 12 is forked as at 17, and has journally mounted therein a grooved caster or roller 18 which is adapted to engage the inwardly extending rib 19 usually provided on the conventional type of rim, the rib 19 providing a tracking means for the roller 18.

Slidably mounted in the bore of sleeve 13 is one end 20 of a stub shaft having its lower end 21 of a larger diameter and slidably mounted in bearing 16, the end 21 of said shaft being slotted as at 22 throughout the major portion of its length, and passing through the slot 22 is a plate 23 which has its outer ends bent upwardly as at 24 to engage the sides of bearing 16 and be secured thereto by fastening means 25. Engageable with plate 23 and pivotally secured between the forks of end 22 of the shaft is a cam 26 to be later described.

Fixed on the stub shaft intermediate its ends are a pair of spaced collars 27 provided with flanges 28 adapted to receive therebetween the inwardly extending projections or lugs 29 formed on the inner ends of the members 12, said members 12 being swung on their pivots 11 by means of projections 29 upon movement of the stub shaft, as will be obvious. The stub shaft is reciprocated in the yoke member by means of a handle 30 adapted to be engaged in a recess 31 in the face of cam 26, the cam 26, upon movement of its pivot, moving the stub shaft.

In operation, the outer ends of rim engaging members 12 are moved inwardly, as depicted in dotted lines in Fig. 1, and member 15 adjusted by means of its threaded engagement with sleeve 13 to engage the rim. The cam 26 is then rotated on its pivot in an anti-clockwise direction with respect to its position depicted in Fig. 2, thus moving the stub shaft outwardly, forcing the members 12 in opposite directions, as depicted in full lines in Fig. 1, spreading the rim at its split 6. The handle 30 is then removed from the opening 31, and its flattened end 30' inserted in the split of the rim, as best shown in Fig. 1, and force is exerted to offset the ends of the rim at the split when the members 12 are permitted to return to their dotted line positions in Fig. 1.

The device may be folded as illustrated in Fig. 4 by turning the members 12 on their pivot, disengaging the projections 29 from between flanges 28, whereby the same will occupy very small amount of space in the tool kit of the car.

What I claim as my invention is:

1. A tire rim tool comprising a yoke member, a rim engaging member carried by said yoke member and substantially rigid therewith, a pair of rim engaging members pivotally carried by the yoke member, and means slidably mounted in said yoke member and engageable with said pivoted rim engaging members adjacent their pivots for swinging said pivoted members on their pivots to spread the rim.

2. A rim spreader comprising a yoke member, a rigid rim engaging member carried by the yoke member, a pair of swinging rim engaging members having their inner ends pivoted to said yoke member, rollers journaled in the outer ends of said swinging members adapted for engagement with the inner periphery of a rim, a slidably mounted member carried by said yoke member and connected with the inner ends of said swinging members inwardly of their pivots, and means for moving said sliding member to swing said swinging members on their pivots to spread the rim.

3. A tire rim tool comprising a yoke member, a plurality of rim engaging members having their inner ends connected with the yoke member and having their outer ends engageable with a rim, an inwardly projecting lug formed on the inner end of one of said rim engaging members, and means engaging said lug and operable to swing said rim engaging member to spread the rim.

4. A rim spreader comprising a yoke member, an adjustable and substantially rigid rim engaging member carried by the yoke member, a pair of pivoted rim engaging members carried by the yoke member, a stub shaft slidably mounted in the yoke member, means adjustably connecting said shaft and the pivoted rim engaging members, and means for moving the stub shaft to swing said pivoted rim engaging members on their pivots to spread the rim.

5. A rim spreader comprising a yoke member, an adjustable and substantially rigid rim engaging member carried by the yoke member, a pair of pivoted rim engaging members carried by the yoke member, a stub shaft slidably mounted in the yoke member, inwardly extending projections on the pivoted members near their inner ends, means on said stub shaft and engaging said projections, and means for moving the stub shaft to swing the pivoted rim engaging members on their pivots to spread the rim.

6. A rim spreader comprising a yoke member including a sleeve portion and a recessed portion formed by oppositely extending arms and provided with a central bore, a stationary rim engaging member having its inner end adjustably engaged with the sleeve of said yoke member, a pair of swinging rim engaging members having their inner ends pivoted to the arms of said yoke, a stub shaft slidably mounted in the bore of said yoke member, spaced collar members intermediately fixed to said shaft, inwardly extending projections formed on the inner end of said swinging members and confined between said collar members, means moving said shaft to swing said last mentioned rim engaging members on their pivots to spread the rim, and roller means on the outer ends of said last mentioned rim engaging members, substantially as described.

In testimony whereof, I affix my signature.

FRIEDRICH LEDERER.